(12) United States Patent
Jung et al.

(10) Patent No.: US 12,334,490 B2
(45) Date of Patent: Jun. 17, 2025

(54) BATTERY CELL WITH IMPROVED WELDABILITY AND APPARATUS FOR PROCESSING THE SAME

(71) Applicant: LG ENERGY SOLUTION, LTD., Seoul (KR)

(72) Inventors: Dae Ho Jung, Daejeon (KR); Jae Young Jang, Daejeon (KR); Seong Ju Hwang, Daejeon (KR); Sang Jin Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 763 days.

(21) Appl. No.: 17/604,813

(22) PCT Filed: Dec. 14, 2020

(86) PCT No.: PCT/KR2020/018261
§ 371 (c)(1),
(2) Date: Oct. 19, 2021

(87) PCT Pub. No.: WO2021/153902
PCT Pub. Date: Aug. 5, 2021

(65) Prior Publication Data
US 2022/0209373 A1    Jun. 30, 2022

(30) Foreign Application Priority Data

Jan. 30, 2020 (KR) .................. 10-2020-0010843

(51) Int. Cl.
*H01M 10/04*    (2006.01)
*B21D 17/02*    (2006.01)
(Continued)

(52) U.S. Cl.
CPC ........ *H01M 10/0404* (2013.01); *B21D 17/02* (2013.01); *B21D 22/04* (2013.01);
(Continued)

(58) Field of Classification Search
None
See application file for complete search history.

(56) References Cited

U.S. PATENT DOCUMENTS 5,497,685 A    3/1996    Mohr
2006/0057457 A1    3/2006    Bang
(Continued)

FOREIGN PATENT DOCUMENTS

CN    101170172 A    4/2008
CN    104051931 A    9/2014
(Continued)

OTHER PUBLICATIONS

Machine translation of KR 2014-0027775 A (Year: 2014).*
(Continued)

*Primary Examiner* — Robert S Carrico
(74) *Attorney, Agent, or Firm* — Birch, Stewart, Kolasch & Birch, LLP

(57) ABSTRACT

Disclosed is a battery cell with improved weldability and an apparatus for processing the same, and more particularly to a battery cell including an electrode assembly received in a cell case; and a pair of electrode leads constituted by a negative electrode lead and a positive electrode lead protruding outwards from the cell case, wherein: the negative electrode lead is made of a nickel material and is provided with one or more embossed portions, and the positive electrode lead is made of an aluminum material and is provided with no embossed portion.

15 Claims, 7 Drawing Sheets

(51) Int. Cl.

| | | |
|---|---|---|
| *B21D 22/04* | (2006.01) | |
| *B26D 1/04* | (2006.01) | |
| *B26D 1/06* | (2006.01) | |
| *B26D 7/01* | (2006.01) | |
| *H01M 50/105* | (2021.01) | |
| *H01M 50/176* | (2021.01) | |
| *H01M 50/533* | (2021.01) | |
| *H01M 50/534* | (2021.01) | |
| *H01M 50/55* | (2021.01) | |
| *H01M 50/557* | (2021.01) | |
| *H01M 50/562* | (2021.01) | |
| *H01M 50/564* | (2021.01) | |

(52) U.S. Cl.
CPC ............... *B26D 1/04* (2013.01); *B26D 1/045* (2013.01); *B26D 1/06* (2013.01); *B26D 7/01* (2013.01); *H01M 50/105* (2021.01); *H01M 50/176* (2021.01); *H01M 50/533* (2021.01); *H01M 50/534* (2021.01); *H01M 50/55* (2021.01); *H01M 50/557* (2021.01); *H01M 50/562* (2021.01); *H01M 50/564* (2021.01)

(56) References Cited

U.S. PATENT DOCUMENTS

| | | |
|---|---|---|
| 2009/0291329 A1 | 11/2009 | Kondou et al. |
| 2014/0147716 A1 | 5/2014 | Oh et al. |
| 2020/0185783 A1 | 6/2020 | Takahashi |

FOREIGN PATENT DOCUMENTS

| | | |
|---|---|---|
| CN | 207874421 U | 9/2018 |
| JP | 6-206197 A | 7/1994 |
| JP | 2006-49275 A | 2/2006 |
| JP | 4726622 B2 | 7/2011 |
| JP | 2018-122385 A | 8/2018 |
| JP | 2019-29277 A | 2/2019 |
| KR | 2003-0003537 A | 1/2003 |
| KR | 10-0502315 B1 | 9/2005 |
| KR | 10-2006-0011312 A | 2/2006 |
| KR | 10-2012-0065279 A | 6/2012 |
| KR | 10-2014-0027775 A | 3/2014 |
| KR | 10-2015-0049462 A | 5/2015 |
| KR | 10-2015-0055190 A | 5/2015 |
| KR | 10-1522450 B1 | 5/2015 |
| KR | 10-1772729 B1 | 8/2017 |
| KR | 10-1813249 B1 | 12/2017 |
| WO | WO 2013/024984 A2 | 2/2013 |
| WO | WO 2019/039436 A1 | 2/2019 |

OTHER PUBLICATIONS

Machine translation of KR 2015-0049462 A (Year: 2015).*
International Search Report for PCT/KR2020/018261 (PCT/ISA/210) mailed on Apr. 6, 2021.
Extended European Search Report for European Application No. 20917141.2, dated Jul. 18, 2022.

* cited by examiner

[FIG. 1] (Conventional Art)
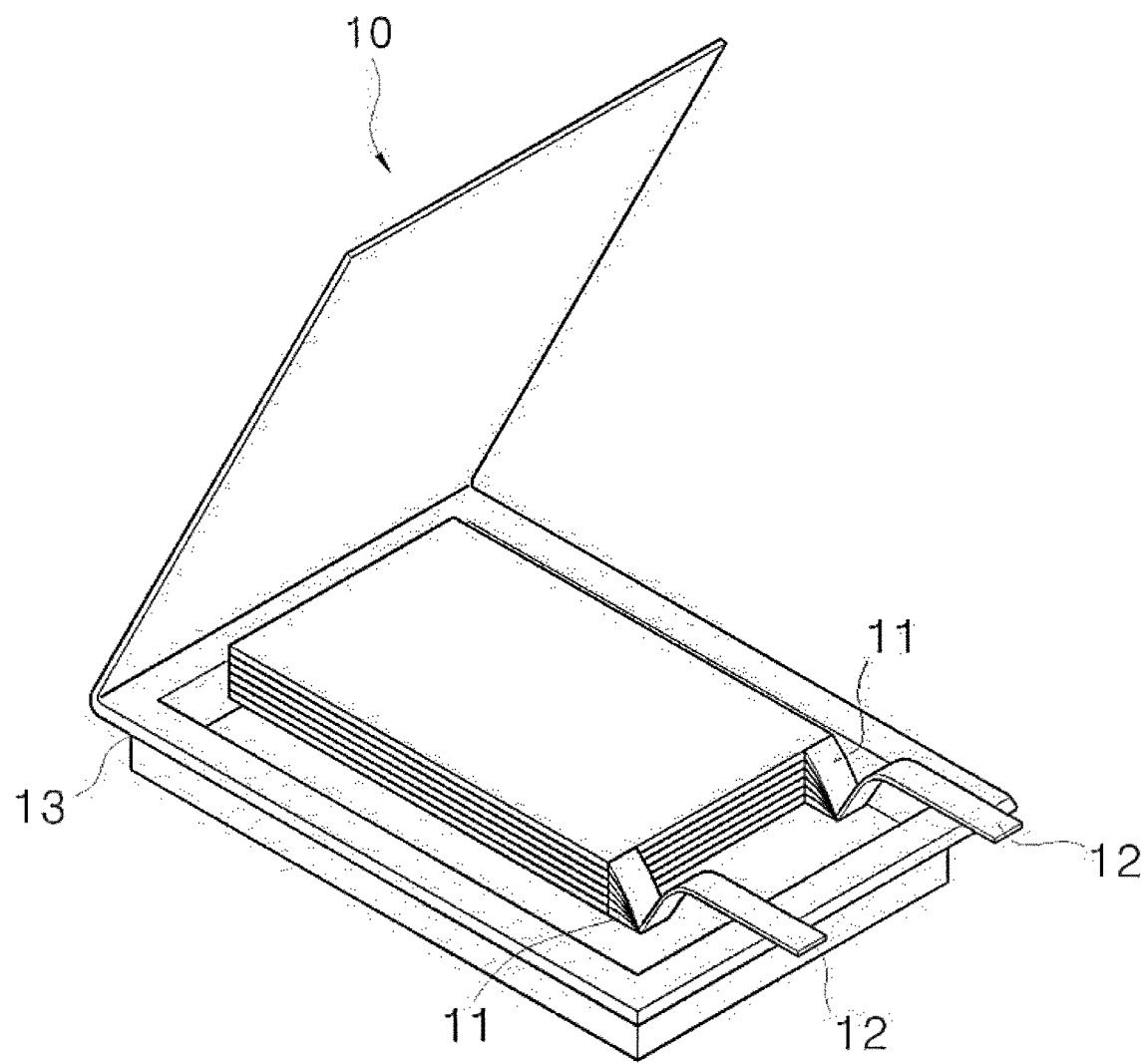

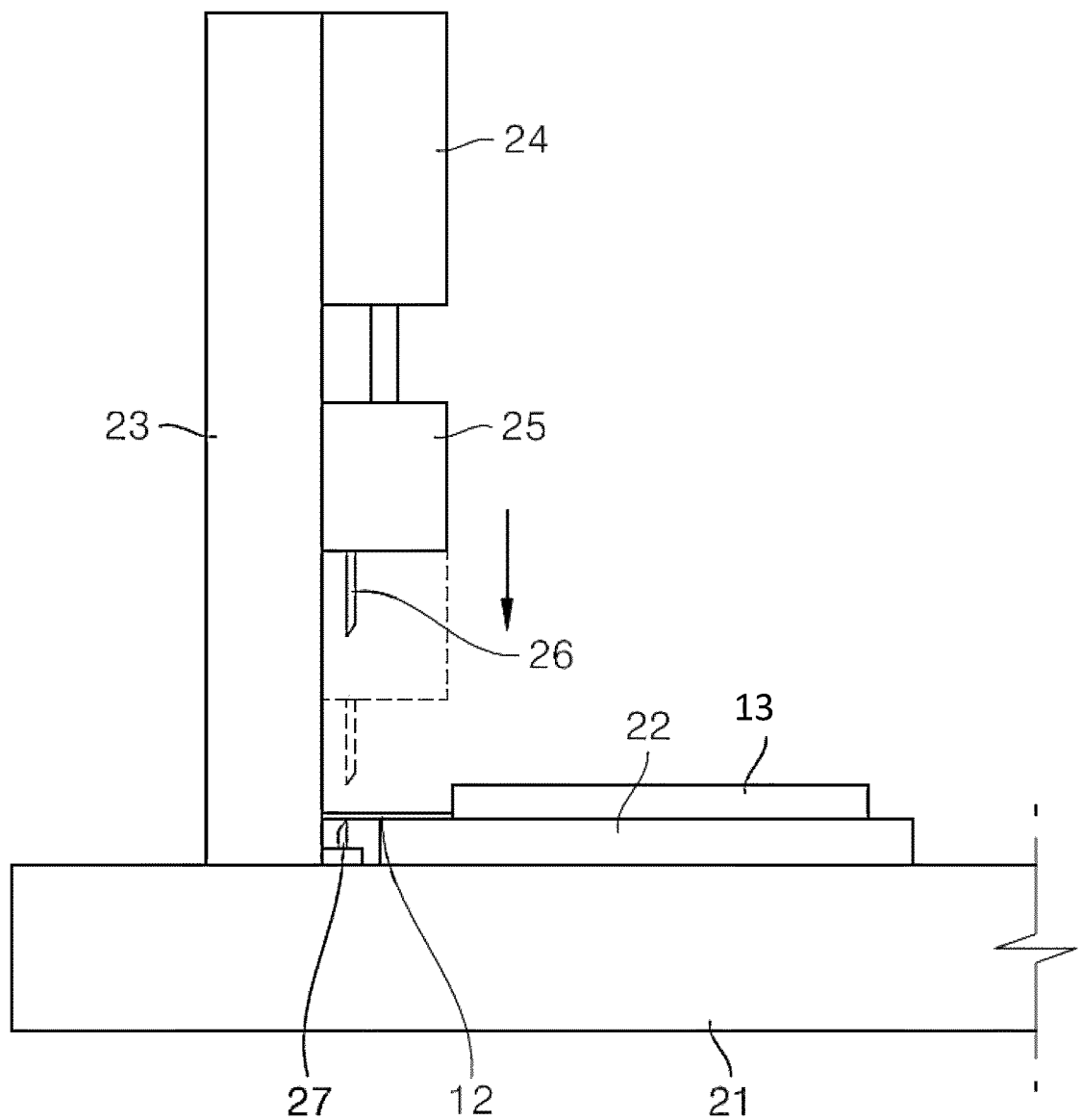
[FIG. 2] (Conventional Art)

[FIG. 3]
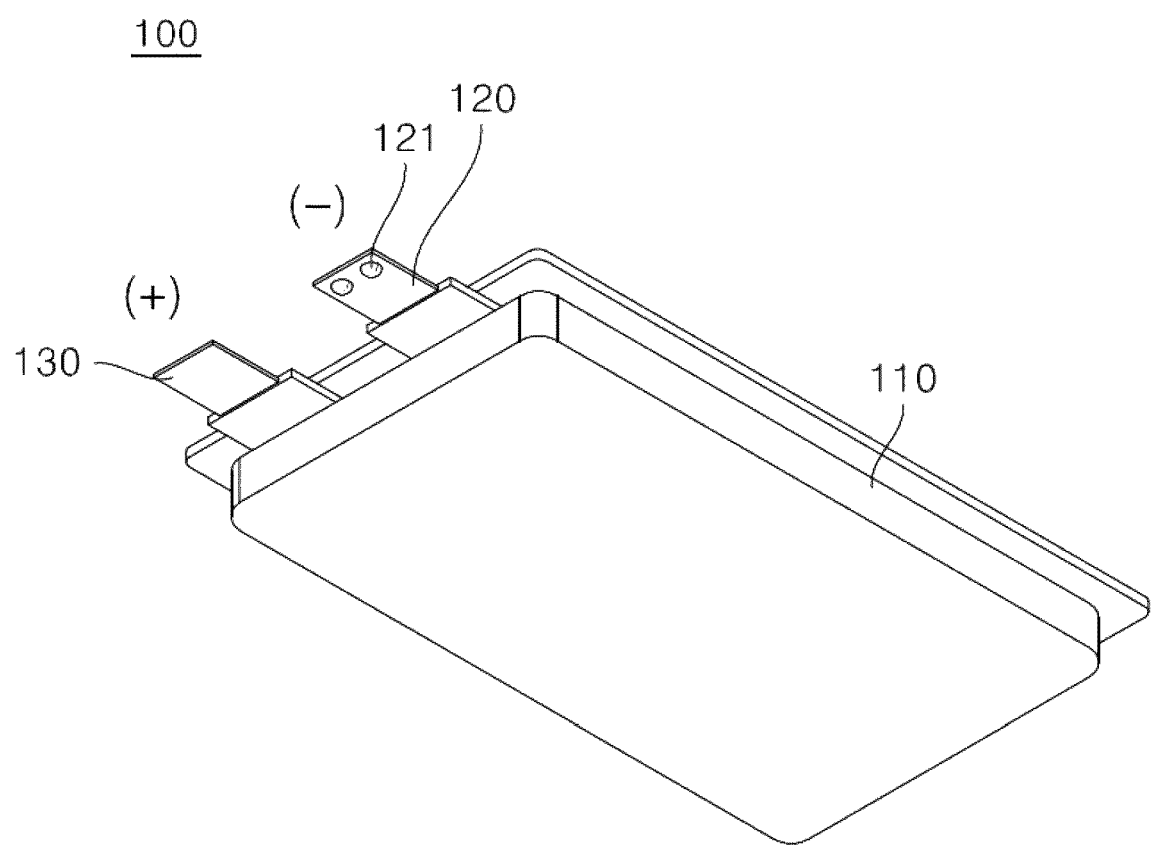

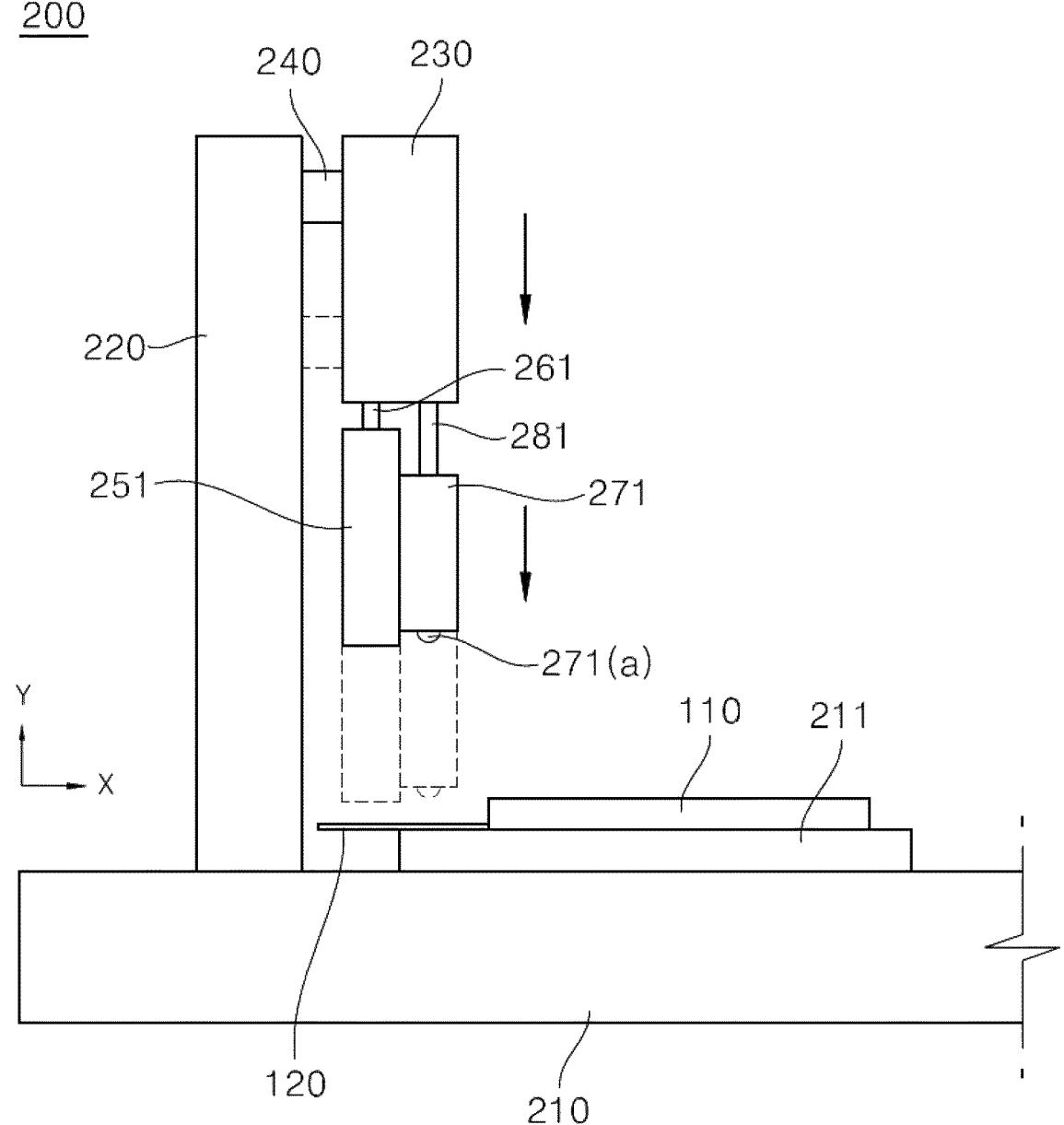

[FIG. 5]
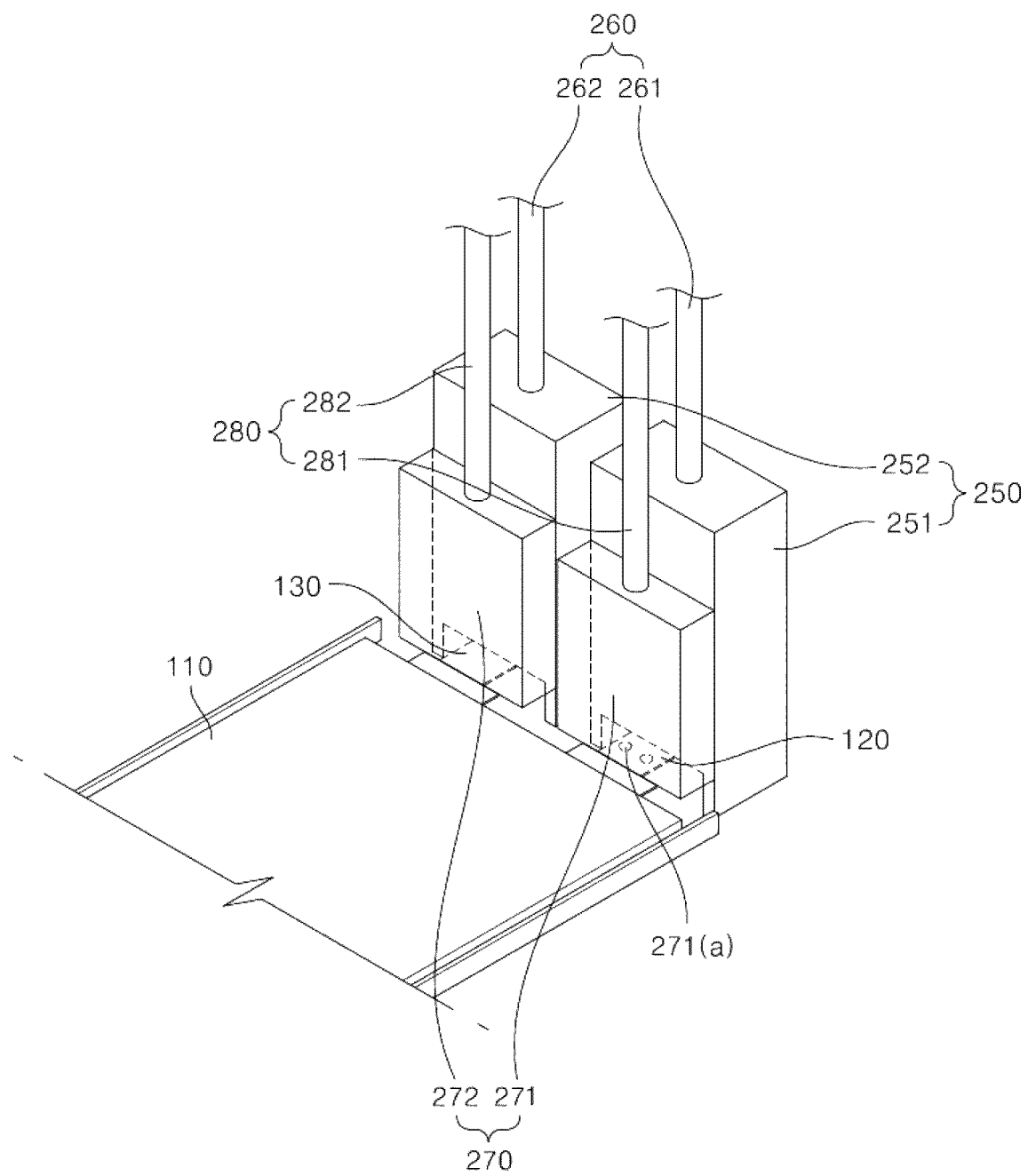

[FIG. 6]
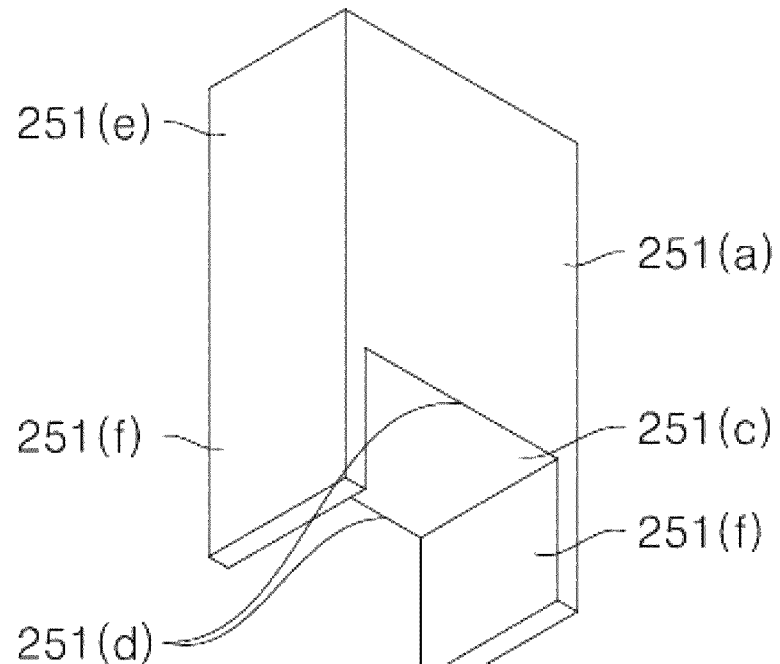
(a)
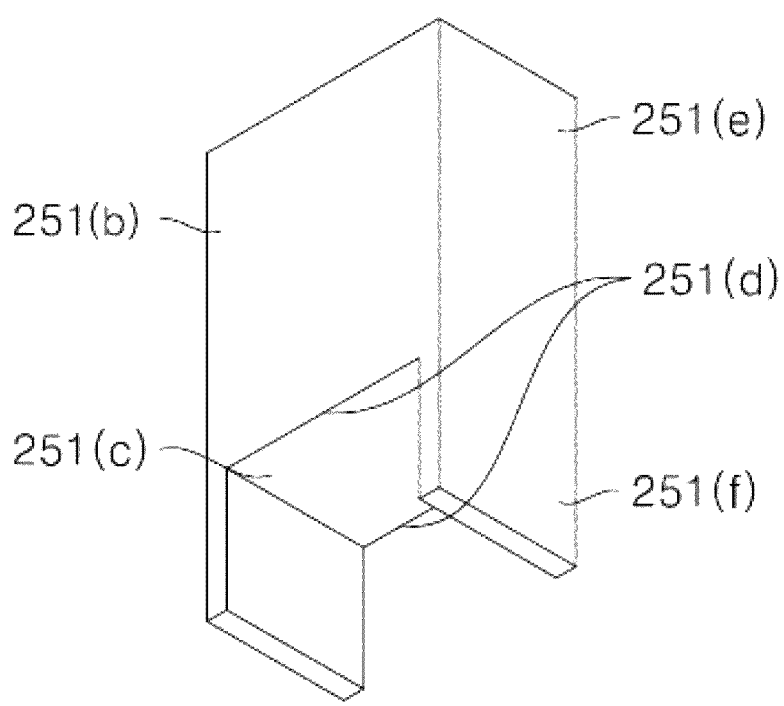
(b)

[FIG. 7]
270
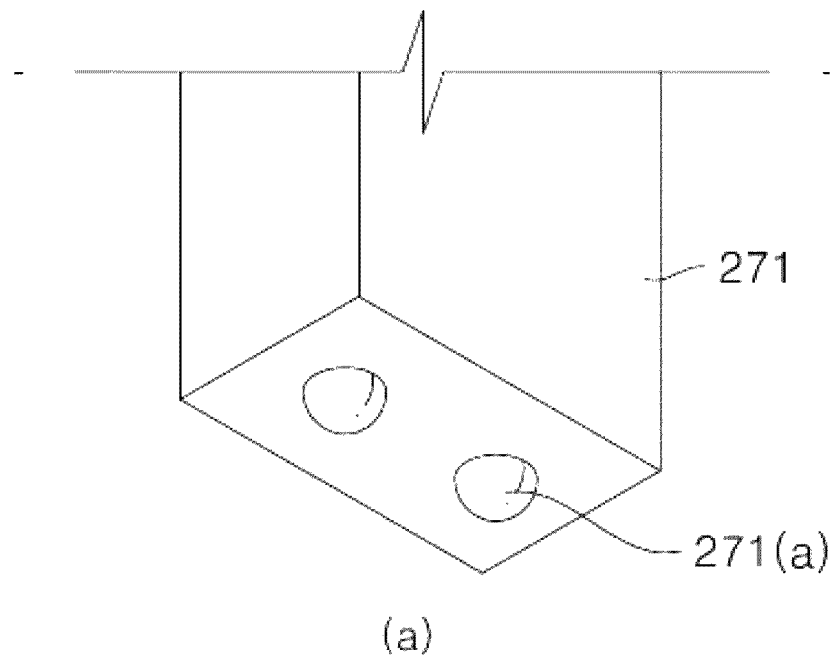
(a)
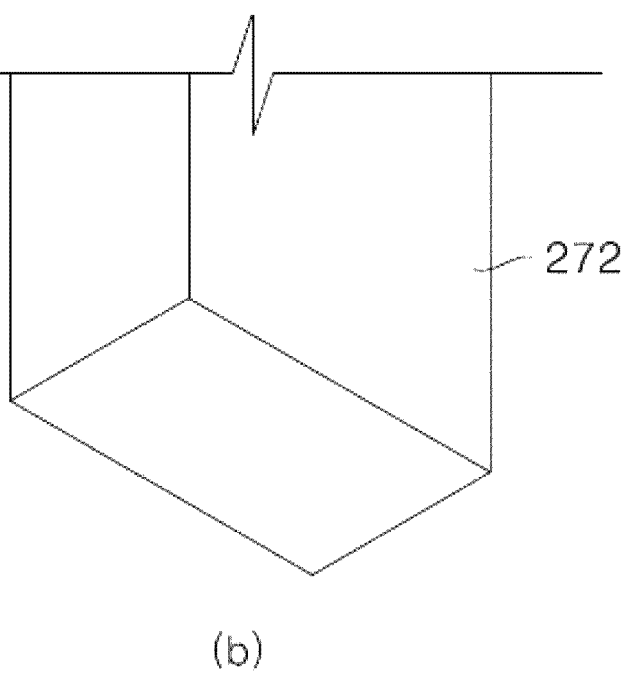
(b)

BATTERY CELL WITH IMPROVED WELDABILITY AND APPARATUS FOR PROCESSING THE SAME

TECHNICAL FIELD

This application claims the benefit of priority to Korean Patent Application No. 2020-0010843 filed on Jan. 30, 2020, the disclosure of which is hereby incorporated by reference herein its entirety.

The present invention relates to a battery cell with improved weldability and an apparatus for processing the same, and more particularly to a battery cell with improved weldability configured such that a negative electrode lead is provided with an embossed portion, whereby weld defects are minimized, and such that the embossed portion can be formed in the negative electrode lead simultaneously with cutting of leads, whereby the battery cell is easily processed, and an apparatus for processing the same.

BACKGROUND ART

With technological development of mobile devices, such as mobile phones, laptop computers, camcorders, and digital cameras, and an increase in demand therefor, research on secondary batteries, which are capable of being charged and discharged, has been actively conducted. In addition, secondary batteries, which are energy sources substituting for fossil fuels causing air pollution, have been applied to an electric vehicle (EV), a hybrid electric vehicle (HEV), and a plug-in hybrid electric vehicle (P-HEV), and therefore there is an increasing necessity for development of secondary batteries.

There are a nickel-cadmium battery, a nickel-hydride battery, a nickel-zinc battery, and a lithium secondary battery as currently commercialized secondary batteries. Thereamong, the lithium secondary battery is in the spotlight, since the lithium secondary battery has little memory effect, whereby the lithium secondary battery is capable of being freely charged and discharged, has a very low self-discharge rate, and has high energy density, compared to the nickel-based secondary batteries.

In the case in which the above secondary battery is used in a device that requires large capacity and high voltage, such as an electric vehicle, a separate metal plate is necessary in order to connect a plurality of battery cells to each other in series or in parallel. That is, a plurality of electrode leads is coupled to each other, or an electrode lead and a metal plate are coupled to each other, using a known joining method, such as welding. At this time, however, weld defects occur due to various causes, whereby manufacturing costs are increased.

As shown in FIG. 1, which is a perspective view of a conventional battery cell, the conventional battery cell 10 includes an electrode assembly, a pair of electrode leads 12 welded to a plurality of electrode tabs 11 extending from the electrode assembly, and a case 13 configured to receive the electrode assembly. However, since each of the electrode leads 12 has a simple flat shape, as described above, the electrode leads may not be properly brought into tight contact with an object to be welded, whereby there is a high possibility of occurrence of weld defects.

Meanwhile, a battery cell undergoes a process of cutting leads thereof so as to satisfy prescribed standards. At this time, the leads may be bent and thus may not be cut at predetermined positions thereof, or cutters configured to cut the leads must be frequently replaced.

FIG. 2 is a side view of a conventional battery cell processing apparatus. As shown in FIG. 2, the conventional processing apparatus is configured such that a seating jig 22 is located on the upper surface of a base 21 and such that a cutting body 23, a pneumatic member 24, a cutting member 25, and an upper cutting knife 26 are provided adjacent thereto.

At the time of processing a battery cell, therefore, a cell case 13 is mounted on the seating jig 22 such that a lead 12 is exposed in the direction in which the cutting body 23 is located, the upper cutting knife 26 is moved downwards, and the lead 12 is cut at the point at which a lower cutting knife 27 is located.

Since the upper cutting knife 26 and the side surface of the seating jig 22 are greatly spaced apart from each other, however, the portion of the lead 12 located on the right side of the upper cutting knife 26 is bent downwards, whereas the portion of the lead 12 located on the left side of the lower cutting knife 27 is bent upwards. In many cases, therefore, the cut surface may not be vertical.

Furthermore, the upper cutting knife and the lower cutting knife, which form a pair of cutting knives, are provided, whereby the apparatus is complicated. Also, in the case in which the cutting knives become dull, both of the cutting knives must be replaced, whereby maintenance expenses are increased.

PRIOR ART DOCUMENT (Patent Document 1) Korean Patent Application Publication No. 2006-0011312

DISCLOSURE

Technical Problem

The present invention has been made in view of the above problems, and it is an object of the present invention to provide a battery cell configured such that weld quality of the battery cell can be improved at the time of resistance welding.

It is another object of the present invention to provide a battery cell processing apparatus capable of reducing maintenance expenses while accurately cutting leads of a battery cell.

Technical Solution

In order to accomplish the above objects, a battery cell according to the present invention is configured such that an electrode assembly is received in a cell case (110) and a pair of electrode leads constituted by a negative electrode lead (120) and a positive electrode lead (130) protrudes outwards from the cell case (110), wherein the negative electrode lead (120) is made of a nickel material and is provided with one or more embossed portions (121), and the positive electrode lead (130) is made of an aluminum material and is provided with no embossed portion.

In addition, a battery cell processing apparatus according to the present invention includes a base portion (210) having a seating die (211), configured to support a cell case (110) and a pair of leads, provided on the upper surface thereof, a vertical fixing portion (220) fixed to a predetermined region of one side of the base portion (210) so as to be perpendicular to the base portion, a block portion (230) connected to the vertical fixing portion (220) so as to be movable upwards and downwards relative to the vertical fixing portion, a pair of cutters (250) located at the bottom surface of the block portion (230), the pair of cutters being configured to cut a negative electrode lead (120) and a positive electrode lead (130), the pair of cutters being spaced apart from each other by a predetermined distance, and a pair of support portions (270) located at the bottom surface of the block portion (230), the pair of support portions being located parallel to the pair of cutters (250) in a horizontal direction, wherein one of the pair of support portions (270) is provided on the bottom surface thereof with protrusions (271(a)) configured to form embossed portions (121) in the negative electrode lead (120).

Also, the battery cell processing apparatus according to the present invention may further include a second connection portion (260) configured to connect the block portion (230) and the pair of cutters (250) to each other and a third connection portion (280) configured to connect the block portion (230) and the pair of support portions (270) to each other, wherein the third connection portion (280) may be constituted by an elastic member capable of being expanded and contracted in a vertical direction, and the second connection portion (260) may not be capable of being expanded and contracted in the vertical direction.

Also, in the battery cell processing apparatus according to the present invention, the third connection portion (280) may include a spring.

Also, in the battery cell processing apparatus according to the present invention, the pair of cutters (250) may include a first cutter (251) and a second cutter (252), the pair of support portions (270) may include a first support portion (271) and a second support portion (272), and the first cutter (251) and the first support portion (271) may be located adjacent to each other while the second cutter (252) and the second support portion (272) may be located adjacent to each other.

Also, in the battery cell processing apparatus according to the present invention, each of the cutters (250) may have a polyhedral shape.

Also, in the battery cell processing apparatus according to the present invention, each of the cutters (250) has a hexahedral shape.

Also, in the battery cell processing apparatus according to the present invention, each of the cutters (250) may include a front portion (251(a)), a rear portion (251(b)), a bottom portion (251 (c)) configured to connect lower parts of the front portion (251(a)) and the rear portion (251(b)) to each other, a pair of edge portions (251(d)) formed at the position at which the front portion (251(a)) and the bottom portion (251(c)) join each other and the position at which the rear portion (251(b)) and the bottom portion (251(c)) join each other, and a pair of side portions (251(e)) configured to connect side parts of the front portion (251(a)) and the rear portion (251(b)) to each other, and each of the pair of side portions (251(e)) may be further provided with an extension portion (251(f)) extending a predetermined length in a downward direction.

Also, in the battery cell processing apparatus according to the present invention, each of the edge portions (251(d)) may form a right angle.

Also, in the battery cell processing apparatus according to the present invention, one side surface of each of the cutters (250) may be moved along one side surface of the seating die (211) in the vertical direction, and each of the support portions (270) may be moved above the upper surface of the seating die (211) in the vertical direction.

Also, in the battery cell processing apparatus according to the present invention, the distance between the one side surface of the seating die (211) and the one side surface of each of the cutters (250) may be greater than 0 mm to less than 0.05 mm.

In addition, a battery cell processing method according to the present invention includes a first step of placing a battery cell to be processed on the upper surface of a seating die (211) of a base portion (210), a second step of moving the seating die (211) forwards, a third step of moving a block portion (230) downwards in the vertical direction to cut a negative electrode lead (120) and a positive electrode lead (130) to a predetermined length and at the same time to form one or more embossed portions (121) in the negative electrode lead (120), and a fourth step of separating the processed battery cell from the seating die (211), the steps being repeatedly performed, wherein, after a predetermined number of battery cells are processed, cutters (250) are rotated 180 degrees in a clockwise direction or in a counterclockwise direction, and the steps are repeatedly performed.

Advantageous Effects

A battery cell according to the present invention has an advantage in that a negative electrode lead of the battery cell is provided with one or more embossed portions, whereby weld quality of the battery cell is improved at the time of resistance welding with a metal plate.

In addition, a battery cell processing apparatus according to the present invention has an advantage in that a cutter configured to cut a lead and a support portion configured to form an embossed portion and to support the lead are simultaneously moved upwards and downwards by driving of a block portion, whereby processing accuracy is high and processing time is reduced.

Furthermore, the cutter according to the present invention has a tetragonal shape, whereby durability of the cutter is excellent, and a pair of opposite edges of the cutter can be used as the edges of a knife, which is economical.

DESCRIPTION OF DRAWINGS

FIG. 1 is a perspective view of a conventional battery cell.

FIG. 2 is a side view of a conventional battery cell processing apparatus.

FIG. 3 is a perspective view of a battery cell according to a preferred embodiment of the present invention.

FIG. 4 is a side view of a battery cell processing apparatus according to a preferred embodiment of the present invention.

FIG. 5 is a perspective view of the battery cell processing apparatus according to the preferred embodiment of the present invention.

FIG. 6 is a perspective view of a cutter according to a preferred embodiment of the present invention (FIG. 6(a) is a front perspective view and FIG. 6(b) is a rear perspective view).

FIG. 7 is a perspective view of support portions according to a preferred embodiment of the present invention (FIG. 7(a) is a perspective view of a first support portion and FIG. 7(b) is a perspective view of a second support portion).

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a battery cell with improved weldability, a battery cell processing apparatus, and a battery cell processing method according to the present invention will be described with reference to the accompanying drawings.

FIG. 3 is a perspective view of a battery cell according to a preferred embodiment of the present invention. As shown in FIG. 3, the battery cell according to the present invention includes a cell case 110, an electrode assembly (not shown), and a pair of leads.

The cell case 110 is generally configured to have a laminate sheet structure including an inner layer, a metal layer, and an outer layer. The inner layer is disposed in direct contact with the electrode assembly, and therefore the inner layer must exhibit high insulation properties and high resistance to an electrolytic solution. In addition, the inner layer must exhibit high sealability in order to hermetically seal the cell case from the outside, i.e. a thermally-bonded sealed portion between inner layers must exhibit excellent thermal bonding strength. The inner layer may be made of a material selected from among a polyolefin-based resin, such as polypropylene, polyethylene, polyethylene-acrylic acid, or polybutylene, a polyurethane resin, and a polyimide resin, which exhibit excellent chemical resistance and high sealability. However, the present invention is not limited thereto, and polypropylene, which exhibits excellent mechanical-physical properties, such as tensile strength, rigidity, surface hardness, and resistance to impact strength, and excellent chemical resistance, is the most preferably used.

The metal layer, which is disposed so as to abut the inner layer, corresponds to a barrier layer configured to prevent moisture or various kinds of gas from permeating into the battery from the outside. Aluminum foil, which is light and easily formable, may be used as a preferred material for the metal layer.

The outer layer is provided on the other surface of the metal layer. The outer layer may be made of a heat-resistant polymer that exhibits excellent tensile strength, resistance to moisture permeation, and resistance to air transmission such that the outer layer exhibits high heat resistance and chemical resistance while protecting the electrode assembly. As an example, the outer layer may be made of nylon or polyethylene terephthalate. However, the present invention is not limited thereto.

The electrode assembly constituting the battery cell 100 may be a jelly-roll type electrode assembly, which is configured to have a structure in which a long sheet type positive electrode and a long sheet type negative electrode are wound in the state in which a separator is interposed between the positive electrode and the negative electrode, a stacked type electrode assembly including unit cells, each of which is configured to have a structure in which a rectangular positive electrode and a rectangular negative electrode are stacked in the state in which a separator is interposed therebetween, a stacked and folded type electrode assembly, which is configured to have a structure in which unit cells are wound using a long separation film, or a laminated and stacked type electrode assembly, which is configured to have a structure in which unit cells are stacked in the state in which a separator is interposed therebetween and are then attached to each other. However, the present invention is not limited thereto.

The pair of electrode leads includes a negative electrode lead 120 and a positive electrode lead 130. The leads may be exposed out of the cell case 110 in the state in which a negative electrode tab and a positive electrode tab of the electrode assembly are electrically connected respectively to the leads. Alternatively, the negative electrode lead 120 and the positive electrode lead 130 may be directly connected to the electrode assembly without the negative electrode tab and the positive electrode tab.

Here, it is preferable that the negative electrode lead 120 be made of a nickel material and be provided with one or more embossed portions 121, more preferably two or more embossed portions. It is more preferable that the positive electrode lead 130 be made of an aluminum material and be formed in a flat shape having no embossed portion.

The battery cell 100 must be joined to a metal plate, such as a nickel plate, for parallel connection or series connection. In the case in which the embossed portions 121 are provided in the negative electrode lead 120 made of the nickel material, welding defects due to weak-welding or non-welding may be minimized at the time of resistance welding.

On the other hand, since the melting point of the positive electrode lead 130 is lower than the melting point of nickel, the positive electrode lead may not be properly joined but may be ruptured at the time of resistance welding. At the time of resistance welding between the nickel plate and the aluminum positive electrode lead, therefore, it is advantageous that no embossed portion is formed in the positive electrode lead in order to secure sufficient contact area.

FIG. 4 is a side view of a battery cell processing apparatus according to a preferred embodiment of the present invention, and FIG. 5 is a perspective view of the battery cell processing apparatus according to the preferred embodiment of the present invention.

Referring to FIGS. 4 and 5, the battery cell processing apparatus 200 according to the preferred embodiment of the present invention includes a base portion 210, a vertical fixing portion 220, a block portion 230, a first connection portion 240, a pair of cutters 250, a pair of second connection portions 260, a pair of support portions 270, and a pair of third connection portions 280.

The base portion 210 may be configured to have the shape of an approximately quadrangular plate having a flat upper surface, and a seating die 211 located on the upper surface may be mounted so as to be slidable forwards or rearwards, which is an X-axis direction. Here, it is preferable that one side surface of the seating die 211, on which the negative electrode lead 120 is seated and from which the negative electrode lead protrudes, be perpendicular to the negative electrode lead.

The vertical fixing portion 220 located at one side of the base portion 210, specifically, the vertical fixing portion 220 fixed to the rear of the base portion 210 so as to be perpendicular to the base portion, is configured to hold the pair of cutters 250 and the pair of support portions 270 connected to the block portion 230 so as to be movable upwards and downwards in the state of being spaced apart from the seating die 211 by a predetermined distance. That is, the block portion 230 is movable upwards and downwards (in a Y-axis direction) through the intervention of the first connection portion 240, one side of which is connected to the vertical fixing portion 220 and the other side of which is connected to the block portion 230.

Of course, it is obvious that a separate pneumatic means (not shown) is mounted to the first connection portion 240 in order to move the block portion 230 upwards and downwards.

Meanwhile, it is more preferable that the vertical fixing portion 220 be constituted by two pillars or a single pillar having a large width in order to secure stability thereof, although the vertical fixing portion is configured to have a single pillar shape having a small width.

The block portion 230, which is supported by the vertical fixing portion 220 so as to be movable upwards and downwards, may have a predetermined shape, such as a hexahedral shape. Here, the block portion 230 may be constituted by two parts. However, it is more preferable that a single block portion be provided in order to simultaneously move the pair of cutters 250 and the pair of support portions 270 upwards and downwards by one manipulation.

The pair of cutters 250 and the pair of support portions 270 are located under the block portion 230. A first cutter 251 and a second cutter 252, which constitute the pair of cutters 250, are configured to cut the negative electrode lead 120 and the positive electrode lead 130 to a predetermined length, respectively.

The pair of support portions 270, which includes a first support portion 271 and a second support portion 272, is configured to prevent the leads from being bent at the time of cutting, thereby minimizing product defects. In addition, the pair of support portions is configured to form the embossed portions 121 in the negative electrode lead 120 simultaneously with cutting.

FIG. 6 is a perspective view of a cutter according to a preferred embodiment of the present invention (FIG. 6(*a*) is a front perspective view and FIG. 6(*b*) is a rear perspective view), and FIG. 7 is a perspective view of support portions according to a preferred embodiment of the present invention (FIG. 7(*a*) is a perspective view of a first support portion and FIG. 7(*b*) is a perspective view of a second support portion).

The first cutter 251 and the second cutter 252 according to the present invention are identical in construction to each other. Consequently, only the first cutter 251 will be described in detail with reference to FIG. 6.

The first cutter 251 includes a front portion 251(*a*), a rear portion 251(*b*), a bottom portion 251(*c*), a pair of edge portions 251(*d*), and a pair of side portions 251(*e*).

In particular, the bottom portion 251(*c*) connects lower parts of the front portion 251(*a*) and the rear portion 251(*b*) to each other, and the pair of edge portions 251(*d*), which is formed at the position at which the front portion 251(*a*) and the bottom portion 251(*c*) join each other and at the position at which the rear portion 251(*b*) and the bottom portion 251(*c*) join each other, serves as the edge of a knife configured to cut the lead.

Here, it is preferable that the angles of the edge portions 251(*d*), i.e. the angle between the front portion 251(*a*) and the bottom portion 251(*c*) and the angle between the rear portion 251(*b*) and the bottom portion 251(*c*), be a right angle. This configuration is provided to cut each of the negative electrode lead 120 and the positive electrode lead 130 so as to have a vertical cut surface.

Each of the pair of side portions 251(*e*) may be further provided with an extension portion 251(*f*) extending a predetermined length in a downward direction. This con-figuration is provided to allow the cutter 251 to move along slit grooves formed in the seating die 211 at the time of upward and downward movement thereof to thus accurately guide sliding of the cutter 251 in a vertical direction without being twisted leftwards and rightwards.

Of course, the first cutter 251 may have a polyhedral shape with the extension portions 251(*f*) omitted, for example, a hexahedral shape.

As shown in FIG. 7, the support portions 270 include a first support portion 271 configured to support the negative electrode lead 120 and at the same time to form the embossed portions 121 and a second support portion 272 configured to support the positive electrode lead 130. The bottom surface of each of the support portions 270 is flat so as to support the upper surface of a corresponding one of the leads in the state of being in entirely tight contact therewith.

Of course, the first support portion 271 is provided on the bottom surface thereof with protrusions 271*a* equal in number to embossed portions 121 to be formed.

Referring back to FIGS. 4 and 5, the cutters 250 and the support portions 270 having the constructions described above are disposed as follows. The support portions 270 are located at positions relatively close to the cell case 110, and the cutters 250 are located at positions relatively distant from the cell case. In addition, the support portions 270 and the cutters 250 are located so as to be adjacent to each other.

Specifically, the first cutter 251 and the first support portion 271 constitute one assembly, and the second cutter 252 and the second support portion 272 constitute another assembly. The distance between each of the support portions and a corresponding one of the cutters may be greater than 0 mm to less than 0.1 mm. In the case in which the support portion and the cutter are disposed in tight contact with each other, the side surface of the support portion and/or the cutter may be worn by friction, and great driving force is necessary to move the support portion and the cutter upwards and downwards. In the case in which the support portion and the cutter are disposed so as to be excessively spaced apart from each other, on the other hand, it is not possible to inhibit bending of the lead, whereby it is not possible to accurately cut the lead.

Meanwhile, the cutters 250 are connected to the block portion 230 via the second connection portions 260, and the support portions 270 are connected to the block portion 230 via the third connection portions 280. Specifically, the first cutter 251 and the second cutter 252 are connected to a 2' connection portion 261 and a 2" connection portion 262, respectively, and the first support portion 271 and the second support portion 272 are connected to a 3' connection portion 281 and a 3" connection portion 282, respectively.

Here, each of the third connection portions 280 connected to the support portions 270, i.e. each of the 3' connection portion 281 and the 3" connection portion 282, is constituted by an elastic member capable of being expanded and contracted in the vertical direction, such as a spring, whereas each of the 2' connection portion 261 and the 2" connection portion 262 connected to the cutters 250 is configured in the form of a bar having no length change.

Of course, when force of expansion and contraction is insufficient by the provision of only the elastic members, such as the springs, air cylinders may be further provided between the block portion 230 and the third connection portions 280 and/or between the third connection portions 280 and the support portions 270, although not shown in the figures.

That is, the reason for this is that, when the block 230 is moved downwards, as shown in FIG. 4, the first support portion 271 must push the lead while being located on the upper surface of the lead, and the first cutter 251 must be moved downwards more than the first support portion 271 in order to cut the lead.

At this time, the distance between the vertical surface of the seating die 211 and one side surface of the first cutter 251 that faces the vertical surface of the seating die 211 may be greater than 0 mm to less than 0.05 mm. This configuration is provided to prevent friction therebetween and to accurately cut the lead.

Next, a battery cell processing method using the processing apparatus described above will be described.

The battery cell processing method according to the present invention includes a first step of placing a battery cell to be processed on the upper surface of the seating die 211 of the base portion 210, a second step of moving the seating die 211 forwards, a third step of moving the block portion 230 downwards in the vertical direction to cut a negative electrode lead 120 and a positive electrode lead 130 to a predetermined length and at the same time to form one or more embossed portions 121 in the negative electrode lead 120, and a fourth step of separating the processed battery cell from the seating die 211. The above steps are repeatedly performed.

In particular, when one edge of each of the cutters 250, which corresponds to the edge of a knife, becomes dull as the result of processing a predetermined number of battery cells, the cutters 250 are separated from the block portion 230 and are then rotated 180 degrees clockwise or counterclockwise in order to cut leads using the other edges.

Meanwhile, in the case in which both of the opposite edges have been used, the bottom portion 251(c) of each of the cutters 250, each of which is made of a metal material, may be ground or cut by a predetermined thickness such that the front portion 251(a) and the bottom portion 251(c) form a right angle therebetween and the rear portion 251(b) and the bottom portion 251(c) form a right angle therebetween, whereby the cutters may be reused.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE SYMBOLS

100: Battery cell
110: Cell case
120: Negative electrode lead 121: Embossed portion
130: Positive electrode lead
200: Processing apparatus
210: Base portion
211: Seating die
220: Vertical fixing portion
230: Block portion
240: First connection portion
250: Cutter
251: First cutter
251(a): Front portion
251(b): Rear portion
251(c): Bottom portion
251(d): Edge portion
251(e): Side portion
251(f): Extension portion
252: Second cutter
260: Second connection portion
261: 2' connection portion
262: 2" connection portion
270: Support portion
271: First support portion
271(a): Protrusion
272: Second support portion
280: Third connection portion
281: 3' connection portion
282: 3" connection portion

The invention claimed is:

1. A battery cell processing apparatus, the battery cell processing apparatus being configured to process a battery cell, the battery cell processing apparatus comprising:
a base portion having a seating die provided on an upper surface thereof, the seating die being configured to support a cell case and a pair of electrode leads;
a vertical fixing portion fixed to a predetermined region of one side of the base portion so as to be perpendicular to the base portion;
a block portion connected by a first connection portion to the vertical fixing portion so as to be movable upwards and downwards relative to the vertical fixing portion;
a pair of cutters located at a bottom surface of the block portion, the pair of cutters being configured to cut a negative electrode lead and a positive electrode lead respectively, the pair of cutters being spaced apart from each other by a predetermined distance; and
a pair of support portions located at the bottom surface of the block portion, the pair of support portions being located parallel to the pair of cutters in a horizontal direction, respectively,
wherein:
one of the pair of support portions is provided on a bottom surface thereof with protrusions configured to form one or more embossed portions in the negative electrode lead,
wherein the battery cell comprising:
an electrode assembly received in the cell case; and
the pair of electrode leads constituted by the negative electrode lead and the positive electrode lead protruding outwards from the cell case,
wherein the negative electrode lead comprises a nickel material and is provided with the one or more embossed portions, and
wherein the positive electrode lead comprises an aluminum material and is provided with no embossed portion.

2. The battery cell processing apparatus according to claim 1, further comprising:
a second connection portion configured to connect the block portion and the pair of cutters; and
a third connection portion configured to connect the block portion and the pair of support portions,
wherein the third connection portion is constituted by an elastic member capable of being expanded and contracted in a vertical direction, and
wherein the second connection portion is not capable of being expanded and contracted in the vertical direction.

3. The battery cell processing apparatus according to claim 2, wherein the third connection portion comprises a spring.

4. The battery cell processing apparatus according to claim 3, wherein:

one side surface of each of the pair of cutters is moved along one side surface of the seating die in the vertical direction, and each of the pair of support portions is moved above an upper surface of the seating die in the vertical direction.

5. The battery cell processing apparatus according to claim 4, wherein a distance between the one side surface of the seating die and the one side surface of each of the pair of cutters is greater than 0 mm to less than 0.05 mm.

6. The battery cell processing apparatus according to claim 2, wherein:

the pair of cutters comprises a first cutter and a second cutter, the pair of support portions comprises a first support portion and a second support portion, and the first cutter and the first support portion are located adjacent to each other while the second cutter and the second support portion are located adjacent to each other.

7. The battery cell processing apparatus according to claim 1, wherein each of the pair of cutters has a polyhedral shape.

8. The battery cell processing apparatus according to claim 7, wherein each of the pair of cutters has a hexahedral shape.

9. The battery cell processing apparatus according to claim 7, wherein:

each of the pair of cutters comprises a front portion, a rear portion, a bottom portion configured to connect lower parts of the front portion and the rear portion to each other, a pair of edge portions formed at a position at which the front portion and the bottom portion join each other and a position at which the rear portion and the bottom portion join each other, and a pair of side portions configured to connect side parts of the front portion and the rear portion to each other, and each of the pair of side portions is further provided with an extension portion extending a predetermined length in a downward direction.

10. The battery cell processing apparatus according to claim 9, wherein each of the pair of edge portions forms a right angle.

11. The battery cell processing apparatus according to claim 9, wherein the pair of edge portions of each of the pair of cutters align with an edge of the seating die to cut the negative electrode lead and the positive electrode lead.

12. The battery cell processing apparatus according to claim 9, wherein the pair of edge portions are recessed relative to the pair of side portions.

13. The battery cell processing apparatus according to claim 1, wherein, in the battery cell, the negative electrode lead and the positive electrode lead are not bent, but are straight.

14. The battery cell processing apparatus according to claim 1, wherein the protrusions are hemispherical.

15. A battery cell processing method using the battery cell processing apparatus according to claim 2, the battery cell processing method comprising:

a first operation of placing a battery cell to be processed on the upper surface of the seating die of the base portion;

a second operation of moving the seating die forwards;

a third operation of moving the block portion downwards in the vertical direction to cut the negative electrode lead and the positive electrode lead to a predetermined length and at the same time to form the one or more embossed portions in the negative electrode lead; and a fourth operation of separating the battery cell that is processed from the seating die, the first, second, third and fourth operations being repeatedly performed, wherein after a predetermined number of battery cells including the battery cell, are processed, the pair of cutters are rotated 180 degrees in a clockwise direction or in a counterclockwise direction, and the first, second, third and fourth operations are repeatedly performed.

* * * * *